B. G. LAMME.
COIL SUPPORT FOR DYNAMO ELECTRIC MACHINERY.
APPLICATION FILED APR. 13, 1905.
1,007,457.
Patented Oct. 31, 1911.
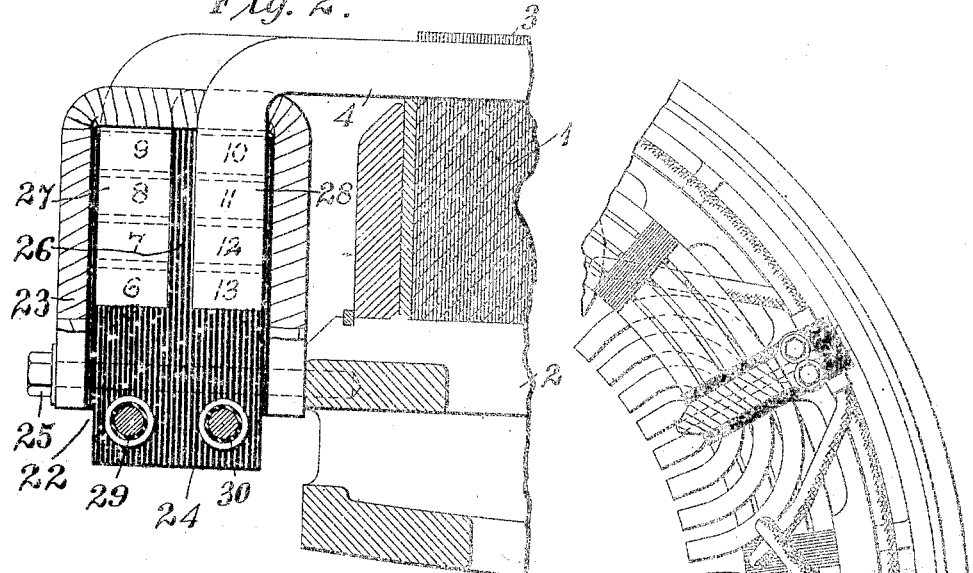
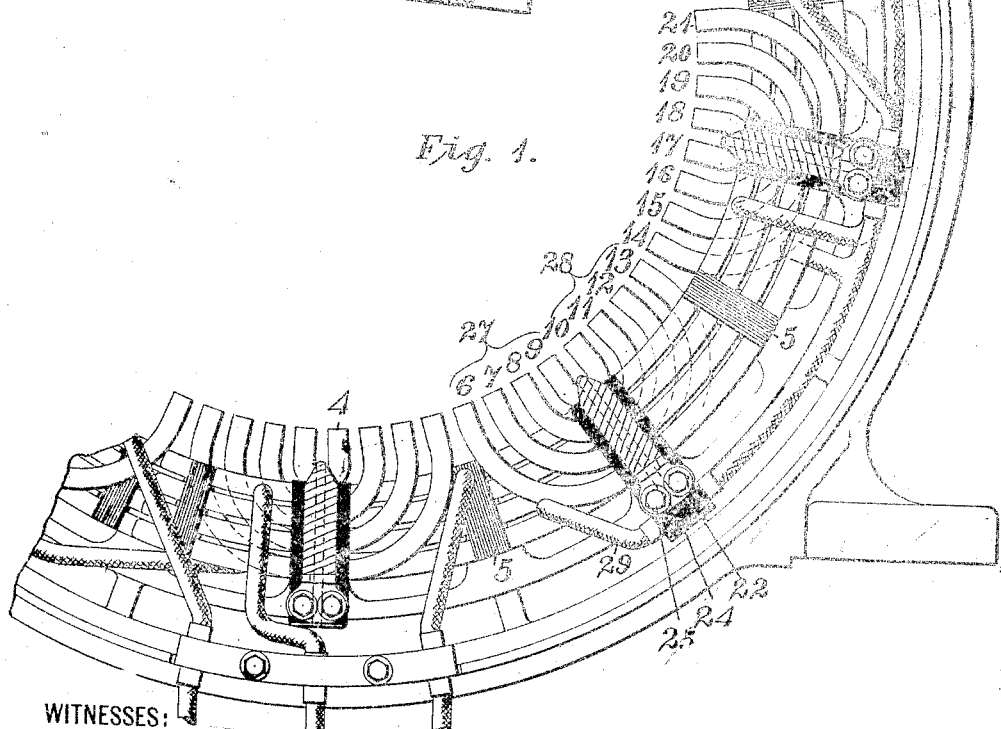
WITNESSES:
Fred H. Miller
R. J. Dearborn
INVENTOR
Benjamin G. Lamme
BY
Kerby Sloan
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC & MANUFACTURING COMPANY, A CORPORATION OF PENNSYLVANIA.

COIL-SUPPORT FOR DYNAMO-ELECTRIC MACHINERY.

1,007,457.

Specification of Letters Patent.

Patented Oct. 31, 1911.

Application filed April 13, 1905. Serial No. 255,399.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Coil-Supports for Dynamo-Electric Machinery, of which the following is a specification.

My invention relates to dynamo-electric machines, and particularly to supports for the coils of stationary armatures.

The object of my invention is to provide means for the support of armature coils which shall effectually prevent warping or displacement of the coils under mechanical and electro-magnetic strains and which shall maintain a high degree of installation.

As commonly constructed, the parts of the armature coils which are not included in the core slots are subjected to tremendous strains which tend to violently distort the coils and inflict serious damage to them in case the armature is short-circuited. This distortion may be due to the reaction, upon each other, of stray magnetic fields which are set up by the excessive short-circuited electric currents in different sets of armature coils, since the tendency to distortion is apparently greatest in machines of large output having comparatively few poles, and in which the ampere turns are concentrated in a small number of groups.

The explanation included herein is not set forth as necessarily specifying the exact cause of coil distortion, but is merely intended as a statement of a reasonable cause for a result which is unquestionable and which may be avoided by my invention, as has been fully demonstrated in practical service.

My invention is illustrated by the accompanying drawing, in which—

Figure 1 is a partial end elevation of a stationary armature equipped with coil supports constructed in accordance therewith, and Fig. 2 is a partial section through the armature core which further discloses one of the coil supports shown in Fig. 1.

Referring to Figs. 1 and 2, a laminated armature core 1 is supported by a frame 2 and is provided with a plurality of slots 3 which receive the armature coils 4. The conductors in the several slots are insulated from each other and are bound together, in the usual manner, to form a series of coils 5. Each side of each coil extends a short distance in a substantially straight line beyond the ends of the slot, then a short distance radially away from the axis of the core 1 and then in a curve which merges into one of large radius that is substantially concentric with the inner surface of the core and parallel to its end surface. The winding is divided into groups of four coils each, and the alternate groups are curved in opposite directions from radial lines. Adjacent groups which extend away from each other are in the same plane parallel to the end of the core and adjacent groups which cross each other are in different parallel planes.

Referring more in detail to Fig. 1 and considering a group of slots 6, 7, 8, 9, 10, 11, 12, 13, 14, 15, 16, 17, 18, 19, 20 and 21, the conductors from slots 10, 11, 12 and 13 are in the same plane as the conductors from slots 14, 15, 16 and 17, while conductors from slots 9, 8, 7 and 6 are in the same plane as the conductors from slots 18, 19, 20 and 21, to which they are respectively connected, but are in a different plane from the aforesaid conductors which project from slots 10 to 17, inclusive. In connecting the conductors pertaining to one group of slots with those pertaining to another group, the conductors from the two slots nearest together are first connected and follow a path of slightly greater radius than a circle passing through the bottom of the slots and substantially concentric therewith, then the conductors from the two slots adjacent to those already connected are connected and bent to follow a path of slightly greater radius than the first and concentric therewith. Similarly, the remainder of the group is connected, the two nearest connected slots being separated by two groups of four slots. Those conductors which lie in a plane nearer the end of the frame are, of course, connected first and those in the second, more distant plane are connected thereafter. The portions of the coils 5 that are not included in the slots 3 are held in position by a support 22 which comprises a yoke 23, a spacing block 24 and a plurality of clamping bolts 25. The spacing block 24 of insulating material is provided with a projection 26 which fits closely between a group of coils 27 and another group of coils 28, the body portion of said block fitting against the outer coils 6 and 13 and between the arms of the yoke 22. Holes are provided in the block 24 to receive the clamping bolts 25 which pass through the two arms of the yoke and the block and are threaded into the frame 2. It may be found desirable in some, and perhaps in all, cases to cover the yokes or clevises 23 with insulating material, such as tape, which may be readily applied before the yokes are placed in position on the machine. The body portion of the spacing block 24 may be extended to serve as a support for a plurality of cross-connections 29 and 30 which pass through holes in the block that are perpendicular to the clamping bolts 25 and in a plane farther from the center of the core.

Although I have shown a specific form of coil support applied to a specific winding, I desire it to be understood that any variations in the size or form of support, or in the kind of winding to which it is applied, that do not materially change the mode of operation or the result obtained, shall be regarded as within the scope of my invention. It will also be understood that my invention is not restricted to use in connection with the windings of the stationary members of electrical machines, whether generators or motors, except insofar as limitations may be imposed by the character of the winding or the service to be performed.

I claim as my invention:

1. A coil-end brace comprising a yoke, a block having a body portion and a relatively thin spacing portion, and one or more bolts for clamping said yoke and said block together and to a rigid support.

2. In a dynamo-electric machine, the combination with a core, a frame therefor, and a winding, portions of which are located in a plurality of slots in said core, of a plurality of bracing supports each of which fits between end portions of said winding that occupy different planes and against the outer members of said end portions.

3. In a dynamo-electric machine, the combination with a stationary frame, a core supported by said frame and provided with a plurality of slots, and a winding partially located therein, of supporting means for said winding that comprises a plurality of yokes and spacing blocks, and means for clamping them to said frame.

4. In a dynamo-electric machine, the combination with a stationary slotted armature core, a supporting frame therefor, and a winding comprising a plurality of coils, portions of which are located in said armature slots and other portions of which are located in planes substantially parallel to the ends of said armature core, of supporting means for the external portions of said coils that comprises a yoke, a separating block and means for clamping said parts to the armature frame.

5. In a dynamo-electric machine, the combination with a stationary frame, a magnetic core supported thereon and provided with a plurality of slots and a winding partially located in said slots, of supporting means for said winding that comprises one or more yoke pieces partially surrounding said winding, and spacing blocks between portions of said winding and attached to said yoke pieces, and means for fastening said parts to the supporting frame.

6. In a dynamo-electric machine, the combination with a core provided with a plurality of slots, a supporting frame and a winding partially included in said slots, of supporting means for said winding that comprises a plurality of yokes and spacing blocks attached to said frame, said spacing blocks acting as supports for cross-connections between points in said winding.

7. A coil support comprising an insulating block, a yoke or clevis and one or more bolts that project through said block and the ends of said yoke or clevis.

8. In a dynamo-electric machine, the combination with a frame, a slotted core supported thereby, and coils located in and projecting beyond the ends of said slots, of a series of insulating blocks fitting against and between adjacent coil ends, yokes fitted over said blocks, and means for fastening said blocks and yokes to the core frame.

9. In a dynamo-electric machine, the combination with a frame, a slotted core and coils located in and projecting beyond said core slots into different planes, of radially disposed insulating blocks fitted against and between the coil ends that are in different planes, yokes or clevises that inclose the coil ends and means for fastening them to the corresponding blocks and to the core frame.

10. In a dynamo-electric machine, the combination with a frame, a slotted core and coils in the core slots that are joined by concentric portions in different planes, of uniformly spaced radial blocks of insulating material that fit between the end portions that are in different planes, yokes that embrace the end portions in both planes, and means for clamping the yoke ends to the blocks and to the core frame.

11. A coil-end brace comprising a yoke covered with insulating material, a block having a body portion and a relatively thin spacing portion, and one or more bolts for clamping said yoke and said block together and to a rigid support.

12. In a dynamo-electric machine, the combination with a frame, a slotted core and coils located in and projecting beyond said core slots into different planes, of radially disposed insulating block is fitted against and between the coil ends that are in different planes, yokes or clevises that are covered with insulating material and inclose the coil ends, and means for fastening them to the corresponding blocks and to the core frame.

13. A coil-end brace comprising a block having a spacing projection, a yoke having an insulating covering and embracing said block, and means for fastening said yoke and said block to a supporting structure.

14. A coil-end brace comprising an insulating block having a spacing projection, an insulated metal yoke embracing said block and means for fastening said yoke and said block to a supporting structure.

15. In a dynamo-electric machine, the combination with a frame, a slotted core supported thereby, and coils located in and projecting beyond the ends of said slots, of a series of insulating blocks fitted to the coil ends, insulated metal yokes embracing said blocks, and means for fastening said blocks and yokes to the core frame.

16. In a dynamo-electric machine, the combination with a slotted core and coils that are located in and project beyond the ends of the core slots, of a set of radially disposed insulating brace-blocks each of which fits between the coil ends of two adjacent groups and against the sides that are most remote from the center of the machine, and means for clamping each brace-block in position.

17. In a dynamo-electric machine, the combination with a frame, a slotted core, and coils that project beyond the ends of the core slots, of an annularly disposed set of radial brace-blocks each of which fits between adjacent sets of coil ends and against the convex sides of the outside coil ends, and means for clamping each brace-block in position.

18. In a dynamo-electric machine, the combination with a frame, a slotted core and coils that are located in the core slots and project beyond their ends, of an annularly disposed set of brace-blocks each of which fits between adjacent sets of projecting coil portions and against the outside members thereof, and means for fastening said brace-blocks to the frame.

19. In a dynamo-electric machine, the combination with a stationary slotted armature core, a supporting frame therefor, and a winding comprising a plurality of coils portions of which are located in said armature slots and other portions of which are located in planes substantially parallel to the ends of said armature core, of supporting means for the external portions of said coils that comprises a yoke, and means for clamping it to the armature frame.

20. A coil support comprising a yoke or clevis and one or more bolts that project through the ends of said yoke or clevis.

21. In a dynamo-electric machine, the combination with a frame, a slotted core supported thereby, and coils located in and projecting beyond the ends of said slots, of a series of insulated metal yokes embracing said coil ends, and means for fastening said yokes to the core frame.

In testimony whereof, I have hereunto subscribed my name this 7th day of April, 1905.

BENJ. G. LAMME.

Witnesses:
ELIZABETH LIVINGSTONE,
BIRNEY HINES.